United States Patent [19]

Freeman et al.

[11] Patent Number: 5,376,151

[45] Date of Patent: Dec. 27, 1994

[54] ENVIRONMENTALLY FRIENDLY METHOD FOR PRODUCING LIGHTFAST BLACK SHADES ON NATURAL AND SYNTHETIC SUBSTRATES

[75] Inventors: Harold S. Freeman, Raleigh, N.C.; Abraham Reife, Toms River, N.J.; Jolanta Sokolawska-Gajda, Raleigh, N.C.

[73] Assignee: North Carolina State University, Raleigh, N.C.

[21] Appl. No.: 49,031

[22] Filed: Apr. 16, 1993

[51] Int. Cl.$^5$ .................... C09B 45/00; C09B 45/14
[52] U.S. Cl. ........................ 8/685; 534/713; 534/721; 534/723; 534/724; 8/917; 8/924
[58] Field of Search .................. 8/681, 685, 917, 924; 534/713, 721, 723, 724

[56] References Cited

U.S. PATENT DOCUMENTS

| | | | |
|---|---|---|---|
| 2,029,568 | 2/1936 | Jaeck et al. | 8/685 |
| 2,034,390 | 3/1936 | Crossley et al. | 260/12 |
| 2,062,547 | 12/1936 | Wiedemann et al. | 260/12 |
| 2,086,854 | 7/1937 | Crossley | 534/724 |
| 2,120,799 | 6/1938 | Crossley et al. | 260/11 |
| 2,136,650 | 11/1938 | Crossley et al. | 260/145 |

(List continued on next page.)

FOREIGN PATENT DOCUMENTS

| | | |
|---|---|---|
| 543916 | 7/1957 | Canada . |
| 560031 | 7/1958 | Canada . |
| 1120041 | 12/1961 | Germany . |
| 4133166 | 4/1992 | Germany . |
| 4133167 | 4/1992 | Germany . |
| 129358 | 6/1987 | Japan . |
| 743907 | 1/1956 | United Kingdom . |
| 744035 | 5/1957 | United Kingdom . |

OTHER PUBLICATIONS

Guido Schetty, "The Irgalan Dyes–Neutral-dyeing Metal–complex Dyes J.S.D.C." 71; (Dec. 1955).

Beffa F. et al., Metal-Complex Dyes for Wool and Nylon–1930 to date Rev. Prog. Coloration vol. 14 (1984).

Gorzka et al. *Dyes and Pigments* "Investigations on Kinetics of Decomposition of Chromium Complex Dyes of 12 and 1:1 Types" pp. 263–275 (1984).

Bulluck et al. *J. Ind. Fabrics* 4(2) "Colorfastness Correlation of Accelerated Aging Methods For Automotive Interior Trim" pp. 23–32 (1985).

Gordon et al. *Organic Chemistry In Color* "Metal Complex Azo Dyes" (1983) pp. 116–121.

Welham *JSDC* "Advances in the Afterchrome Dyeing of Wool" vol. 102 (Apr. 1986) pp. 126–131.

Crossley *American Dyestuff Reporter* "Metallized Azo Dyes" vol. 27, No. 38, pp. 124–129 (1938).

Crossley *American Dyestuff Reporter* "Metallized Acid Azo Dyes" vol. 28, No. 18, pp. 487, 488 and 492 (1939).

*Primary Examiner*—Paul Lieberman
*Assistant Examiner*—Margaret Einsmann
*Attorney, Agent, or Firm*—Richard E. Jenkins

[57] ABSTRACT

Disclosed is an original approach to solving the environmental problem associated with the use of Cr-based metallized azo dyes to deliver black shades on natural and synthetic substrates. This invention affords methods for both the synthesis of metallized dyes and the generation of black dyeings using those dyes without employing metals designated as priority pollutants at any stage in either method. The key element of the disclosure is the use of black 1:2 Fe complexes of azo dyes in lieu of currently used Cr-based complexes which are based on environmentally unfriendly priority pollutant metals without compromising the desirable high fastness properties of the latter complexes, an accomplishment heretofore assumed unachievable.

26 Claims, No Drawings

U.S. PATENT DOCUMENTS

| | | | |
|---|---|---|---|
| 2,213,647 | 9/1940 | Crossley et al. | 260/145 |
| 2,259,735 | 10/1941 | Crossley et al. | 260/145 |
| 2,374,106 | 4/1945 | Kvalnes et al. | 8/42 |
| 2,421,737 | 6/1947 | West et al. | 260/151 |
| 2,422,586 | 6/1947 | Royer et al. | 8/43 |
| 2,434,173 | 1/1948 | Mackenzie et al. | 8/43 |
| 2,479,944 | 8/1949 | Lewis | 260/146 |
| 2,499,133 | 2/1950 | Conrad | 260/151 |
| 2,508,404 | 5/1950 | Kvalnes et al. | 260/146 |
| 2,668,167 | 2/1954 | Monnier | 260/147 |
| 2,709,697 | 5/1955 | Seruto | 260/149 |
| 2,709,698 | 5/1955 | Seruto | 260/200 |
| 2,906,746 | 9/1959 | Brassel et al. | 260/145 |
| 3,003,843 | 10/1961 | Amick | 8/42 |
| 3,019,143 | 1/1962 | Dessauer | 148/6.1 |
| 3,051,696 | 8/1962 | Dettwyler | 260/147 |
| 3,071,571 | 1/1963 | Gross et al. | 534/723 X |
| 3,305,539 | 2/1967 | Freeman | 260/150 |
| 3,343,905 | 9/1967 | Freeman | 8/26 |
| 3,398,136 | 8/1968 | Groebke et al. | 260/207 |
| 3,423,393 | 1/1969 | Klein | 260/147 |
| 3,432,485 | 3/1969 | Neier | 260/145 |
| 3,704,086 | 11/1972 | Bayew et al. | 8/42 |
| 4,120,854 | 10/1978 | Wicki | 260/145 C |
| 4,547,566 | 10/1985 | Bergmann et al. | 534/684 |
| 4,563,520 | 1/1986 | Bergmann et al. | 534/678 |
| 4,638,055 | 1/1987 | Bergmann et al. | 534/678 |
| 4,732,573 | 3/1988 | Hohmann et al. | 8/654 |
| 4,963,659 | 10/1990 | Tzikas | 534/618 |
| 5,084,562 | 1/1992 | Tzikas | 534/618 |
| 5,104,979 | 4/1992 | Hansen | 534/677 |

ENVIRONMENTALLY FRIENDLY METHOD FOR PRODUCING LIGHTFAST BLACK SHADES ON NATURAL AND SYNTHETIC SUBSTRATES

This invention was made with government support under Grant No. 99-27-07400 awarded by the U.S. Department of Commerce. The government has certain rights in the invention.

TECHNICAL FIELD AND BACKGROUND OF THE INVENTION

The present invention relates in general to azo dyes, which are highly colored and thus useful in the dyeing of textiles (fabrics, fibers, yarns, and the like) hereinafter referred to as substrates. More particularly, the present invention represents an important step in the evolution of lightfast, and preferably also washfast, black dyeings on natural substrates (for instance, protein substrates such as wool, leather, and silk) and on synthetic substrates (for instance, nylon which is a synthetic polyamide), as it pertains to the preparation and use of 1:2 Iron (hereinafter Fe) complexes of ortho,ortho'-bis(hydroxy)-substituted monoazo dyes as environmentally friendly viable alternatives to black dyeings derived from 1:2 metal complexes of ortho,ortho'-bis(hydroxy)-substituted monoazo dyes based on metal ions, such as chromium (hereinafter Cr) ions, which are presently regarded by the United States Regulatory Authorities as priority pollutants.

By "environmentally friendly" or "environmentally safe" is meant that the Fe complexed azo dyes, the process of making the dyes, the dyes in substrates dyed with the dyes, and the process of dyeing substrates with the dyes do not produce in wastewater high levels of metal cations regarded as priority pollutants that eventually end up polluting streams, lakes, and rivers. In other words, Fe cations, which are needed by the human body, are not considered toxic, so that there is little or no pollution problem from the manufacture and use of the Fe complexed azo dyes. Recently, it has become evident from the open literature that the presence of color and priority pollutants in industrial wastewaters continues to be a subject of considerable concern. This presence of color and priority pollutants especially causes concern in the textile and dyestuffs industries, where such pollutants arise from the manufacture and use of lightfast metallized Cr, cobalt (hereinafter Co), or copper (hereinafter Cu) complexed azo colorants for natural and synthetic substrates.

By way of background, it is noted that over the years azo dyes metallized with Cr, Co, or Cu ions have become increasingly commercially important in the dyeing of textiles because the dyed textiles showed better lightfastness, rubbingfastness, and washfastness than textiles dyed with the corresponding chemical structural analogues that are unmetallized azo dyes. In particular, metallized azo dyes derived from ortho,ortho'-bis(hydroxy) monoazo dyes constitute an important class of colorants for the dyeing of wool and nylon for applications requiring high stability to prolonged and repeated exposure to ultraviolet radiation, to alkaline media, and to washings. In the case of fast and bright dyeings on wool, chromium has long been believed to be by far the best metal to use in complexing with azo dyes, as other metals have produced metallized azo complexes having inferior fastness to light and washing. For a general discussion of better lightfastness with metallized dyes as compared to unmetallized dyes, see for instance, Crossley, "Metallized Azo Dyes" *American Dyestuff Reporter,* Vol 27, No. 38, pp. 124–129 (December, 1938) and Crossley, "Metallized Acid Azo Dyes" *American Dyestuff Reporter* Vol. 28, No. 18, pp. 487, 488, and 492 (September, 1939).

The first Cr complexes of azo dyes that were developed were actually generated directly on wool fibers by the afterchrome mordant method, discussed in Welham, "Advances in the Afterchrome Dyeing of Wool", JSDC, Vol. 2, pp. 126–131 (April, 1986). This method, created in the 1920's, involves applying appropriately substituted unmetallized azo dyes to wool followed by treating the resultant dyed substrate with Cr(VI) or Cr(III) salts to produce the final color. This method led to the development of unmetallized azo dyes such as C. I. Mordant Black 11, a high volume dyestuff for the afterchrome mordant production of deep colors (for instance, black or grey) on wool where the amount of dye used is large, and where fast dyeings and an economical price are needed. C. I. Mordant Black 11 is illustrated in FIG. 1 of Welham, and is the isomer of the azo dye designated below as Dye 11.

Although this afterchrome mordant method improved the lightfastness and wetfastness of the dull alkali-sensitive dyeings obtained using the metal-free dyes, the method nevertheless afforded wastewater effluents from dye houses containing levels of metal ions deemed harmful to the environment. During the last few decades, when methods for solving environmental concerns arising from afterchrome dyeing were being pursued, it was widely believed, as espoused in the two Crossley articles mentioned above, that Fe azo complexes were so inferior to Cr azo complexes in both fastness and brightness that they could not be seriously considered as viable alternatives. Perhaps this is because in general the early complexes made were actually 1:1 Fe complexed azo dyes rather than the more desirable 1:2 Fe complexed azo dyes of the present invention. This belief in inferiority in turn probably led scientists away from Fe azo complexes as a method for the environmentally friendly application of metallized dyes to wool and nylon.

Thus, primarily as a step-saving way to achieve the good fastness achieved by afterchrome dyeing, the development in the 1930's of a method for dyeing textiles with metallized dyes in which the metal was inserted into the azo dye ligand prior to dyeing the substrate focused on Cr as the metal. Thus, Mordant Black 11 evolved into Cr premetallized azo dyes such as Acid Black 52 and Acid Black 172, which have the following structures designated as dye 2 and dye 3, respectively,

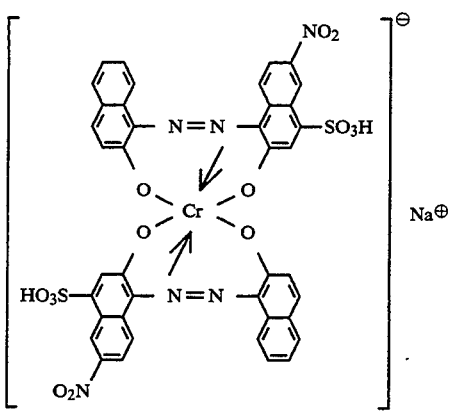

Dye 2 Acid Black 172 (1:2 complex)

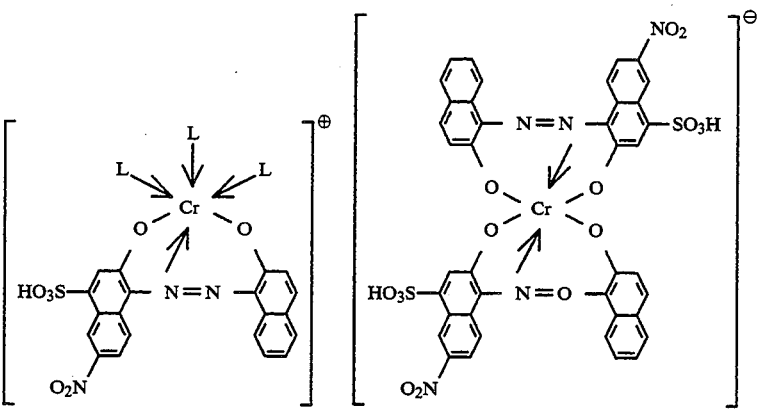

Dye 3 Acid Black 52 (2:3 complex)

and such as Acid Black 107. As that work unfolded, it was determined that the 1:2 premetallized Cr dyes were preferred over the corresponding 1:1 Cr complexes because the acidic pH required to apply the 1:1 Cr complexed azo dyes damaged wool. Interestingly, it was also determined that the toxicity level of residual Cr ion residues from exhausted premetallized dye baths was often greater than that observed in exhausted afterchrome dye baths when a method for reducing residual Cr ions in the latter type of dye bath was employed.

In short, using Cr metallized dyes did not obviate the problem of Cr(VI) and/or Cr(III) in effluent from the dyeing process, which is especially of concern when Cr(VI) is used, as hexavalent chromium is toxic to many forms of aquatic life as well as to the organisms employed to degrade sewage in biological degradation facilities. This concern has led environmental authorities to discourage the continued use of dyeing with both premetallized Cr azo dyes and afterchrome dyes, and to impose severe limitations on the concentration of both Cr(VI) and Cr(III) in effluents. Efforts to comply with these demands led in turn to the development of wastewater treatment methods for lowering Cr ion levels prior to discharging an exhausted dye bath. Typical methods employed include precipitation of the metal followed by collection by filtration, and include reduction of residual Cr(VI) to Cr(III) followed by complexing the resultant Cr(III) ions in situ and absorbing them onto the dyed wool fiber.

Also as further discussed below in connection with the preparation of Acid Black 172 (the Cr complexed azo dye designated above as dye 2), the synthesis of Mordant Black 1 (the unmetallized precursor for making Acid Black 172 and designated below as dye 11) requires copper sulfate. Thus, the manufacture of these dyes produces Cu ion, another priority pollutant in effluent wastewater, resulting in a double pollution problem from the Cu ions produced in the manufacture of these dyes and from the Cr ions produced in the application of these dyes.

Also, it is noted that the metallized Cr dyes themselves can decompose resulting in metal cations being released into rinse water when dyed fabric is washed. For a discussion of the decomposition of Cr complexed azo dyes, see for instance, Gorzka et al., "Investigations On Kinetics of Decomposition of Chromium Complex Dyes of 1:2 and 1:1 Types" *Dyes and Pigments*, Vol. 5, pp 263–275 (1984).

Environmental considerations aside, one of the most important considerations in determining the suitability of dyestuffs for specific applications is lightfastness. Dyes tend to undergo photodegradation upon exposure to light, especially light in the ultraviolet spectrum, resulting in fading of the dyed textile fibers. Automobile upholstery fabrics (including the leather used in expensive automobiles) are used in perhaps one of the most severe and demanding environments for dyestuffs. Automobile interiors may be exposed to direct sunlight over extended periods of time, and may encounter extremely high temperatures and humidities. Also, since people continually move in and out of automobiles, the dye in the automobile upholstery fabrics should not rub off onto clothing. Consequently, automobile upholstery fabrics require good rubbingfastness properties, as well as good lightfastness properties. Most of the dyestuffs presently available, other than the Cr complexed azo dyes, do not provide this high level of these properties demanded in automotive applications, especially where relatively dark colors are required.

The Fe complexed azo dyes of the invention are black, although the corresponding commercial Co structural analogues are red or blue. Examples are Acid Red 182 and Acid Blue 171. Moreover, although Fe complexed azo dyes are expected to have poor lightfastness as compared to Cr complexed azo dyes, as discussed above in connection with the two Crossley articles, the lightfastness properties, and preferably also the rubbingfastness properties, of the black Fe complexed azo dyes of the invention were unexpectedly found to be superior for use on wool and nylon, comparable to those properties in commercially available black 1:2 Cr complexed azo dyes. Thus, the black Fe complexed azo dyes of the invention can be substituted for the black Cr complexed azo dyes, which are among the commercial dyes used for automobile upholstery, but have the drawback of being based on a priority pollutant that is among the most notorious of priority pollutants producing cation contaminants which happen to be very toxic to the human body. Thus, the use of Cr metal ions may be obviated with the present invention.

Obviating Cr metal ions has become increasingly important because the wastewater clean up has become very costly, particularly due to the energy costs resultant from the needed treatment of the wastewater to remove metal cations regarded as toxic. There are four main ways to remove these metal cations, (1) reducing Cr(VI) to Cr(III) followed by complexing the Cr(III) to fabric dyed with a mordant dye, (2) flocculation, (3) ion exchange, and (4) electrolysis, and each is very expensive. Moreover, with (2), (3), and (4) once the metal cations are removed from the wastewater, the resultant is sludge. Now the sludge has to be either put into a landfill or incinerated. If the sludge is put into a landfill, the landfill can end up in a Superfund clean up, another cost. On the other hand, if the sludge is incinerated, the resultant ash, which still contains the priority pollutant, has to go into a landfill, and again the landfill can end up in a Superfund clean up. In contrast, energy is saved with the manufacture and use of the Fe complexed azo dyes of the present invention by not having to do the wastewater cleanup necessitated by the manufacture and use of the Cr complexed azo dyes.

Thus, as can be seen from the above discussion, the formation of metal complexes of azo dyes has figured prominently in dyestuffs chemistry. In addition, a general background discussion of medially metallized azo dyes, where chromium (III), cobalt (III), and copper (II) are the three metal ions used in commercial metal complex azo systems is contained in Gordon and Gregory, "Metal Complex Azo Dyes" *Organic Chemistry in Color,* pp 116–121 (1983).

Of course, many patents and published patent applications also discuss metallized azo dyes. More particularly, Tzikas U.S. Pat. No. 4,963,659 (1990) and U.S. Pat. No. 5,084,562 (1992), both assigned to Ciba-Geigy, require a 1,3,5-triazine system in the dye, but the presence of a metallized azo system in the dye is only optional. U.K. Patents 743,907 (1956) and 774,035 (1957) and Canadian Patents 543,916 (1957) and 560,031 (1958) disclose a reduction to practice of only Cr metallized azo dyes and Co metallized azo dyes. General Aniline & Film German Patent 1,120,041 (1961) and Conrad U.S. Pat. No. 2,499,133 (1950), assigned to Allied Chemical and Dye, disclose a reduction to practice of only Cr metallized azo dyes.

Although Fe salts are not only cheaper than Co and Cr salts but also are potentially more environmentally safe, nevertheless, there do not appear to be many Fe complexed azo dyes that are widely used in the textile industry. Thus, interestingly, very little has been published about the suitability for dyeing textiles with Fe azo complexes as potential alternatives to currently used azo dyes metallized with chromium (VI), chromium (III), or cobalt (II) salts.

However, some patents and published patent applications do disclose a reduction to practice of certain Fe complexed azo dyes. One patent is U.S. Pat. No. 4,732,573 (1988) to Hohmann et al., assignors to Hoechst, which only discloses certain Fe complexed azo dyes in which the azo group is not a coordinating ligand. Instead, the Fe atom is part of an anionic moiety that serves as the counterion for the cationic group in the dyes disclosed. In addition, the disclosed dyes are cationic dyes for the coloration of polyacrylonitrile.

An Fe complex of an azo dyestuff having a nitrophenol moiety was made in U.S. Pat. No. 2,120,799 (1935) to Crossley et al., assignors to Calco Chemical. This Fe complexed azo dyestuff, called Acid Brown 98 (a leather dye), is one example of an Fe azo complex used in textile dyeing. This 1:1 Fe azo complex has the following structure:

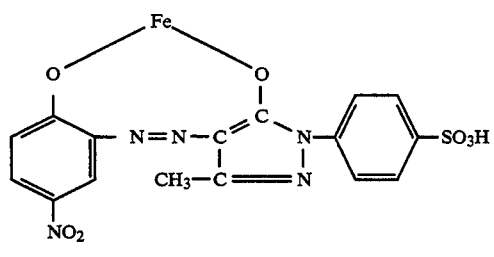

Acid Brown 98
(1:1 Fe complex)

Also, an Fe complex of an azo dyestuff somewhat similar in structure to Acid Brown 98, but instead having the SO₃H attached to the same phenyl ring as the NO₂ and having phenyl instead of methyl attached to the 3-position of the pyrazolone ring, was made in U.S. Pat. No. 3,432,393 (1969) to Klein, assignor to GAF Corporation, for use on leather.

Also, one example of a yellow-brown 1:2 iron complex of disazo dye for application to leather disclosed in the Berenguer et al. Published Patent Applications DE4133166-A and DE413367-A, is designated as follows:

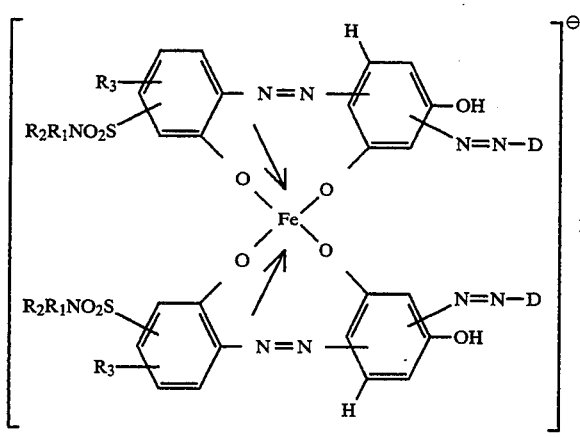

1:2 Fe disazo complex

Other patents and published patent applications which disclose a reduction to practice of certain Fe complexed azo dyes are U.S. Pat. No. 4,120,854 (1978) to Wicki, assignor to Sandoz, U.S. Pat. No. 4,547,566 (1985), U.S. Pat. No. 4,563,520 (1986), and U.S. Pat. No. 4,638,055 (1987), all to Bergmann et al., assignors to BASF, U.S. Pat. No. 5,104,979 (1992) to Hansen et al., assignors to BASF, and German Published Patent Application Nos. DE 4,133,166-A (1992) and 4,133,167-A (1992), both Berenguer et al., assignors to Sandoz. However, all of these patents and published patent application disclose only polyazo dyes, such as disazo, trisazo, or tetrakisazo.

Also, an English language abstract of Niimura et al. Japanese Published Patent Application No. 62-129358-A (published Jun. 11, 1987) defines certain Fe azo compounds as being of the formula:

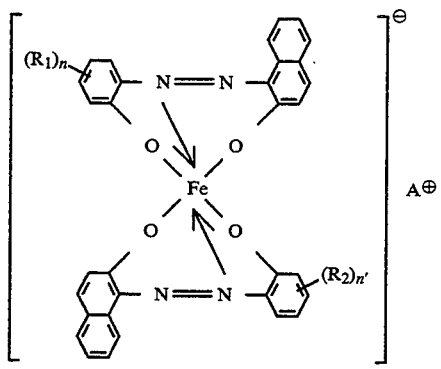

where $R_1$ and $R_2$ are H, $C_{1-18}$ alkyl, alkenyl, sulfonamide, or mesyl, and n and n' are 1 to 4, and A+ is H+, Na+, K+, NH$_4$+, aliphatic ammonium ion, alicyclic ammonium ion, or heterocyclic ammonium ion, for use as a toner for electrophotography. In the reduction of practice disclosed in the English language abstract, A+ is Na+, but $(R_1)_n$ and $(R_2)_n$, are both Cl. Moreover, the English language abstract mentions nothing with respect to use of Fe azo compounds in dyeing textiles (the use of the inventive Fe dyes), but only mentions use as a toner for electrophotography.

SUMMARY OF THE INVENTION

Until now, it has been presumed that the use of Cr-based dyes is essential to the generation of fast black dyeings on wool and nylon, and, consequently, that the removal of Cr-based dyes from commerce would be injurious to industries dependent upon the superior fastness properties heretofore unachievable through the use of environmentally friendly metals such as iron. Thus, the focus has been on removal from wastewater of Cr ions generated during the manufacture and use of Cr complexed azo dyes, rather than on replacing the Cr complexed azo dyes.

The present invention is a departure from conventional approaches to protecting the environment through the use of wastewater treatment methods to remove toxic metal ions resultant from the application of Cr-based metallized dyes to wool, nylon, and leather goods. In fact, the present approach obviates the necessity for Cr(VI) and Cr(III) altogether, and employs instead an environmentally friendly metal, namely Fe, in the development of fast, economical, black shades on protein substrates (such as wool, silk, leather, etc.) and synthetic polyamide substrates (such as nylon). Thus, the present invention affords an approach to solving the environmental pollution problem associated with generating black dyeings on wool, nylon, and leather derived from Cr-based azo dyes by substituting dyeings derived from Fe-based 1:2 premetallized azo dyes.

Thus, the present invention affords an approach to an environmental pollution problem associated with the dyestuff and textile industries by providing environmentally safe 1:2 Fe complexed azo dyes, and environmentally safe dyes in textiles dyed with these dyes, and providing an environmentally safe process of making these dyes and an environmentally safe process of dyeing textiles with these dyes.

The environmentally safe Fe complexed azo dyes are black and thus the present invention also provides textiles dyed with those black Fe complexed azo dyes, which dyed textiles have superior lightfast properties that are comparable to the lightfast properties of textiles dyed with commercially available black 1:2 Cr complexed azo dye. It is a feature of the present invention that although these Fe complexed azo dyes are chemical structural analogues of commercially available Co complexed azo dyes that are red or blue, these particular Fe complexed azo dyes are black. Since they are black, it is an advantage of the present invention that they can be substituted in the dyeing of textiles for the presently commercially available black Cr complexed azo dye, whether from afterchrome mordant dyeing or from dyeing with premetallized Cr complexed azo dye. Undesirably, the commercially available black Cr complexed azo dye is based on a priority pollutant. On the other hand, the black Fe complexed azo dyes are not. Thus, the black Fe complexed azo dyes, which are "environmentally friendly", can be safely used without the concomitant production of high levels of priority pollutant metal ions in wastewater. As a result, the present invention affords a way to obviate completely Cr ion priority pollutants in effluent from the highly commercially significant black Cr complexed azo dyes, particularly used in dyeing polyamide substrates, for instance natural polyamides such as protein substrates or synthetic polyamides such as nylon substrates.

Accordingly, the present invention provides black 1:2 Fe complexed azo dyes. Not only are the black Fe complexed azo dyes environmentally safe, but also the black Fe complexed azo dyes have lightfastness, and preferably also rubbingfastness and washfastness, properties in the dyeing of textiles, comparable to those properties in a 1:2 Cr complexed azo dye, which is based on an environmentally unsafe priority pollutant.

Also, the present invention provides a dyed textile comprising a textile dyed with a black Fe complexed azo dye. The Fe complexed azo dye is an environmentally safe dye, whereby the dye in the dyed textile is environmentally safe. The dyed textile has lightfastness, and preferably also rubbingfastness and washfastness, properties comparable to those properties in a textile dyed at a substantially similar depth with a 1:2 Cr complexed azo dye, which is based on an environmentally unsafe priority pollutant.

The present invention also provides a method of making a black colored dye useful for dyeing the before mentioned substrates. The method comprises (1) diazotization of 1-hydroxy-2-aminobenzene, wherein the benzene moiety is substituted with $SO_2Y$ in the 4-position or the 5-position, (2) coupling the resultant with 7-naphthol, wherein the naphthol moiety is substituted with X in the 1-position, to create an unmetallized dye, (3) converting said unmetallized dye to a 1:2 Fe complex using an Fe salt at a pH of about 8 or less, and then (4) salting out said metallized dye by precipitating with A+ ions, where X is H or NHCOR, R is $C_{1-6}$ alkyl, $C_{1-6}$ alkoxy, or $C_{1-6}$ hydroxyalkyl, Y is OH, $NH_2$, $N(C_{1-6}\ alkyl)_2$, $NH(C_{1-6}\ alkyl)$, or $C_{1-6}$ alkyl, and A is H, K, Na, or $NH_4$, whereby there results a black 1:2 Fe complexed azo dye, whereby said method is environmentally safe.

Various iron salts may be used in the method of making the Fe complexed azo dye of the invention, and preferred salts are iron sulfates, iron nitrates, iron halides, iron formates, iron acetates, and combinations thereof. Most preferred salts are Fe (II) sulfate and Fe (III) sulfate.

Preferably, the method of making a black colored dye useful for dyeing substrates comprises diazotization of 1-hydroxy-2-aminobenzenesulfonamide followed by coupling with 2-naphthol or 1-acetylamino-7-naphthol, to create an unmetallized dye, followed by conversion of said unmetallized dye to a 1:2 Fe complex using Fe(II) sulfate or Fe(III) sulfate in the presence of sodium hydroxide (pH=7.5–8.0) or using Fe(III) sulfate in the presence of sodium formate (pH=5.5–6.0), and then salting out said metallized dye with Na+ ions, whereby there results a black 1:2 Fe complexed azo dye, wherein X is H or $NHCOCH_3$, Y is $NH_2$, and A is Na.

Also, the present invention provides a method of dyeing a textile black comprising dyeing a textile with an Fe complexed azo dye. The Fe complexed azo dye comprises a black 1:2 Fe complexed azo dye and is an environmentally safe dye, whereby the method of dyeing is environmentally safe. The dyed textile has lightfastness, and preferably also rubbingfastness and washfastness, properties comparable to those properties in a textile dyed at a substantially similar depth with a black 1:2 Cr complexed azo dye, which is based on an environmentally unsafe priority pollutant.

Some of the approaches, features, and the like of the invention having been stated hereinabove, objects will become evident as the description proceeds, when taken in connection with the accompanying Laboratory Examples as best described hereinbelow.

DETAILED DESCRIPTION OF THE INVENTION

The present invention provides for the environmentally friendly delivery of black shades to textiles wherein it is unnecessary to use Cr(VI) or Cr(III) and wherein it is unnecessary to compromise the desirable fastness properties of the Cr azo complexes, by using 1:2 Fe-complexed azo dyes of formula (1):

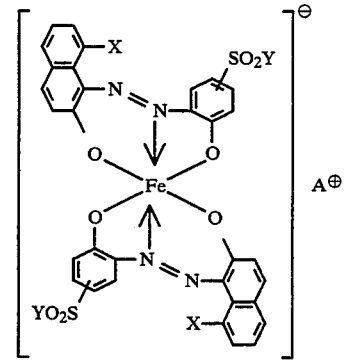

Dye 1 where X is H or NHCOR, R is $C_{1-6}$ alkyl, $C_{1-6}$ alkoxy, or $C_{1-6}$ hydroxyalkyl, Y is OH, $NH_2$, $N(C_{1-6}\ alkyl)_2$, $NH(C_{1-6}\ alkyl)$, or $C_{1-6}$ alkyl, and A is H, K, Na, or $NH_4$, and where $SO_2Y$ may be substituted in the 4,4'-positions or in the 5,5'-positions. More preferably, the dyestuff is selected from the following structures where the respective $SO_2Y$ moieties may be in the 4,4'- or 5,5'-positions:

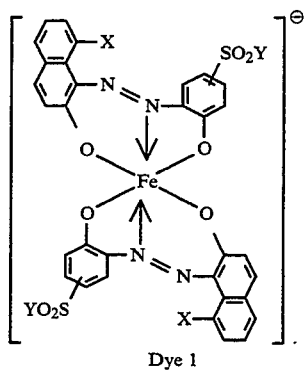

Dye 1

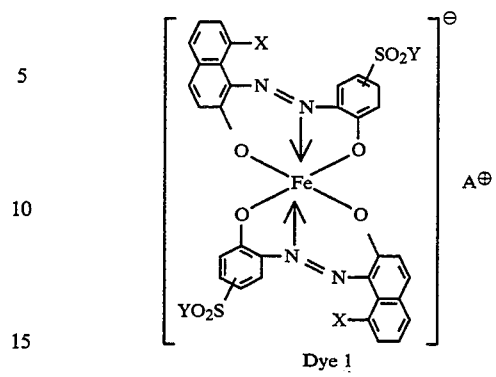

Dye 1

| X | Y | A | R |
|---|---|---|---|
| NHCOR | OH | Na | $C_{1-6}$ alkyl |
| NHCOR | OH | $NH_4$ | $C_{1-6}$ alkyl |
| NHCOR | OH | K | $C_{1-6}$ alkyl |
| NHCOR | OH | H | $C_{1-6}$ alkyl |
| NHCOR | OH | Na | $C_{1-6}$ alkoxy |
| NHCOR | OH | $NH_4$ | $C_{1-6}$ alkoxy |
| NHCOR | OH | K | $C_{1-6}$ alkoxy |
| NHCOR | OH | H | $C_{1-6}$ alkoxy |
| NHCOR | OH | Na | $C_{1-6}$ hydroxyalkyl |
| NHCOR | OH | $NH_4$ | $C_{1-6}$ hydroxyalkyl |
| NHCOR | OH | K | $C_{1-6}$ hydroxyalkyl |
| NHCOR | OH | H | $C_{1-6}$ hydroxyalkyl |
| NHCOR | $NH_2$ | Na | $C_{1-6}$ alkyl |
| NHCOR | $NH_2$ | $NH_4$ | $C_{1-6}$ alkyl |
| NHCOR | $NH_2$ | K | $C_{1-6}$ alkyl |
| NHCOR | $NH_2$ | H | $C_{1-6}$ alkyl |
| NHCOR | $NH_2$ | Na | $C_{1-6}$ alkoxy |
| NHCOR | $NH_2$ | $NH_4$ | $C_{1-6}$ alkoxy |
| NHCOR | $NH_2$ | K | $C_{1-6}$ alkoxy |
| NHCOR | $NH_2$ | H | $C_{1-6}$ alkoxy |
| NHCOR | $NH_2$ | Na | $C_{1-6}$ hydroxyalkyl |
| NHCOR | $NH_2$ | $NH_4$ | $C_{1-6}$ hydroxyalkyl |
| NHCOR | $NH_2$ | K | $C_{1-6}$ hydroxyalkyl |
| NHCOR | $NH_2$ | H | $C_{1-6}$ hydroxyalkyl |
| NHCOR | $NH(C_{1-6}$ alkyl) | Na | $C_{1-6}$ alkyl |
| NHCOR | $NH(C_{1-6}$ alkyl) | $NH_4$ | $C_{1-6}$ alkyl |
| NHCOR | $NH(C_{1-6}$ alkyl) | K | $C_{1-6}$ alkyl |
| NHCOR | $NH(C_{1-6}$ alkyl) | H | $C_{1-6}$ alkyl |
| NHCOR | $NH(C_{1-6}$ alkyl) | Na | $C_{1-6}$ alkoxy |
| NHCOR | $NH(C_{1-6}$ alkyl) | $NH_4$ | $C_{1-6}$ alkoxy |
| NHCOR | $NH(C_{1-6}$ alkyl) | K | $C_{1-6}$ alkoxy |
| NHCOR | $NH(C_{1-6}$ alkyl) | H | $C_{1-6}$ alkoxy |
| NHCOR | $NH(C_{1-6}$ alkyl) | Na | $C_{1-6}$ hydroxyalkyl |
| NHCOR | $NH(C_{1-6}$ alkyl) | $NH_4$ | $C_{1-6}$ hydroxyalkyl |
| NHCOR | $NH(C_{1-6}$ alkyl) | K | $C_{1-6}$ hydroxyalkyl |
| NHCOR | $NH(C_{1-6}$ alkyl) | H | $C_{1-6}$ hydroxyalkyl |
| NHCOR | $N(C_{1-6}$ alkyl$)_2$ | Na | $C_{1-6}$ alkyl |
| NHCOR | $N(C_{1-6}$ alkyl$)_2$ | $NH_4$ | $C_{1-6}$ alkyl |
| NHCOR | $N(C_{1-6}$ alkyl$)_2$ | K | $C_{1-6}$ alkyl |
| NHCOR | $N(C_{1-6}$ alkyl$)_2$ | H | $C_{1-6}$ alkyl |
| NHCOR | $N(C_{1-6}$ alkyl$)_2$ | Na | $C_{1-6}$ alkoxy |
| NHCOR | $N(C_{1-6}$ alkyl$)_2$ | $NH_4$ | $C_{1-6}$ alkoxy |
| NHCOR | $N(C_{1-6}$ alkyl$)_2$ | K | $C_{1-6}$ alkoxy |
| NHCOR | $N(C_{1-6}$ alkyl$)_2$ | H | $C_{1-6}$ alkoxy |
| NHCOR | $N(C_{1-6}$ alkyl$)_2$ | Na | $C_{1-6}$ hydroxyalkyl |
| NHCOR | $N(C_{1-6}$ alkyl$)_2$ | $NH_4$ | $C_{1-6}$ hydroxyalkyl |
| NHCOR | $N(C_{1-6}$ alkyl$)_2$ | K | $C_{1-6}$ hydroxyalkyl |
| NHCOR | $N(C_{1-6}$ alkyl$)_2$ | H | $C_{1-6}$ hydroxyalkyl |
| NHCOR | $C_{1-6}$ alkyl | Na | $C_{1-6}$ alkyl |
| NHCOR | $C_{1-6}$ alkyl | $NH_4$ | $C_{1-6}$ alkyl |
| NHCOR | $C_{1-6}$ alkyl | K | $C_{1-6}$ alkyl |
| NHCOR | $C_{1-6}$ alkyl | H | $C_{1-6}$ alkyl |
| NHCOR | $C_{1-6}$ alkyl | Na | $C_{1-6}$ alkoxy |
| NHCOR | $C_{1-6}$ alkyl | $NH_4$ | $C_{1-6}$ alkoxy |
| NHCOR | $C_{1-6}$ alkyl | K | $C_{1-6}$ alkoxy |
| NHCOR | $C_{1-6}$ alkyl | H | $C_{1-6}$ alkoxy |
| NHCOR | $C_{1-6}$ alkyl | Na | $C_{1-6}$ hydroxyalkyl |
| NHCOR | $C_{1-6}$ alkyl | $NH_4$ | $C_{1-6}$ hydroxyalkyl |
| NHCOR | $C_{1-6}$ alkyl | K | $C_{1-6}$ hydroxyalkyl |
| NHCOR | $C_{1-6}$ alkyl | H | $C_{1-6}$ hydroxyalkyl |
| H | OH | Na | — |
| H | OH | $NH_4$ | — |
| H | OH | K | — |
| H | OH | H | — |
| H | $NH_2$ | Na | — |
| H | $NH_2$ | $NH_4$ | — |
| H | $NH_2$ | K | — |
| H | $NH_2$ | H. | — |
| H | $NH(C_{1-6}$ alkyl) | Na | — |
| H | $NH(C_{1-6}$ alkyl) | $NH_4$ | — |
| H | $NH(C_{1-6}$ alkyl) | K | — |
| H | $NH(C_{1-6}$ alkyl) | H | — |
| H | $N(C_{1-6}$ alkyl$)_2$ | Na | — |
| H | $N(C_{1-6}$ alkyl$)_2$ | $NH_4$ | — |
| H | $N(C_{1-6}$ alkyl$)_2$ | K | — |
| H | $N(C_{1-6}$ alkyl$)_2$ | H | — |
| H | $C_{1-6}$ alkyl | Na | — |
| H | $C_{1-6}$ alkyl | $NH_4$ | — |
| H | $C_{1-6}$ alkyl | K | — |
| H | $C_{1-6}$ alkyl | H | — |

The present invention also provides a method of making a black colored dye useful for dyeing the before mentioned substrates. The method comprises (1) diazotization of 1-hydroxy-2-aminobenzene, wherein the benzene moiety is substituted with $SO_2Y$ in the 4-position or the 5-position, (2) coupling the resultant with 7-naphthol, wherein the naphthol moiety is substituted with X in the 1-position, to create an unmetallized dye, (3) converting said unmetallized dye to a 1:2 Fe complex using an Fe salt at a pH of about 8 or less, and then (4) salting out said metallized dye by precipitating with A+ ions, where X is H or NHCOR, R is $C_{1-6}$ alkyl, $C_{1-6}$ alkoxy, or $C_{1-6}$ hydroxyalkyl, Y is OH, $NH_2$, $N(C_{1-6}$ alkyl$)_2$, $NH(C_{1-6}$ alkyl), or $C_{1-6}$ alkyl, and A is H, K, Na, or $NH_4$, whereby there results a black 1:2 Fe complexed azo dye, whereby said method is environmentally safe.

In the method of making the Fe complex azo dyes of the invention, various iron salts may be used, at a pH of about 8 or less, the pH being chosen so as to avoid formation of iron hydroxide. Preferred iron salts are iron sulfates, iron nitrates, iron halides, iron formates, iron acetates, and combinations thereof. Most preferred are Fe (II) sulfate and Fe (III) sulfate. Preferably, the method for synthesizing dyes of type (1) comprises the diazotization of 1-hydroxy-2-aminobenzenesulfonamide followed by coupling with either 2-naphthol or 1-acetylamino-7-naphthol, followed by converting the metal-free monoazo dye to a 1:2 Fe complex using either Fe(II) sulfate or Fe(III) sulfate at slightly alkaline pH, or using Fe(III) sulfate in the presence of sodium formate at slightly acidic pH.

Using the methods described above and in further detail below, two 1:2 Fe azo complexes, designated below as dye 6 and dye 9, were synthesized. Also for comparison in the dyeing of textiles, instead of purchasing the commercially available 1:2 Cr complexed azo dye known as Acid Black 172, designated below as dye 2, and its unmetallized azo dye precursor known as Mordant Black 11, designated below as dye 11, these dyes were synthesized.

The unmetallized dye 11 was prepared by diazotization of 1-amino-2-naphthol-4-sulfonic acid with $NaNO_2$ in the presence of copper sulfate, followed by nitration with a mixture of sulfuric and nitric acids and coupling of the resulting nitro compound to 2-naphthol. Dye 2 was prepared by treating dye 11 with Na/K chromosalicylate.

Instead of the commercial grey 1:2 chromium complexed azo dye, designated below as dye 10, and instead of the commercial red and blue 1:2 cobalt complexed azo dyes designated below as dye 5 and dye 8, respectively, being purchased, they were synthesized for comparison of color and properties with their structurally analogous 1:2 iron azo complexes, designated below as dye 6 and dye 9, using known procedures. Since these procedures are known, they are not further described in the Laboratory Examples below.

Each dye is designated with the numerals 2, 4, 5, 6, 7, 8, 9, 10, and 11, respectively, and had the structure as noted below.

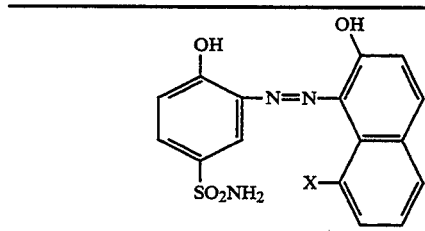

| Dye 4 (Red) | X = H | Unmetallized |
| Dye 5 (Acid Red 182) | X = H | 1:2 Co complex of Dye 4 |
| Dye 6 (Black) | X = H | 1:2 Fe complex of Dye 4 |
| Dye 7 (Blue) | X = $NHCOCH_3$ | Unmetallized |
| Dye 8 (Acid Blue 171) | X = $NHCOCH_3$ | 1:2 Co of Dye 7 |
| Dye 9 (Black) | X = $NHCOCH_3$ | 1:2 Fe complex of Dye 7 |
| Dye 10 (Grey or Black) | X = $NHCOCH_3$ | 1:2 Cr complex of Dye 7 |

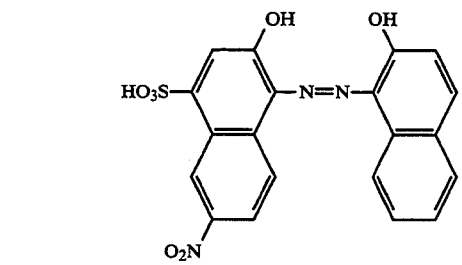

| Dye 11 (Mordant Black 1) | Unmetallized |
| Dye 2 (Acid Black 172) | 1:2 Cr complex of Dye 11 |

All dyes were isolated in the form of their sodium salt.

Formation of the target 1:2 Fe complexes was confirmed by negative ion FAB mass spectrometry using 3-nitrobenzylalcohol as the matrix. In each case, the molecular ion [M−] and/or the pseudomolecular ion [M-Na]− was detected. The FAB mass spectra are not further described in the Laboratory Examples below.

When a black Fe complexed azo dye of the invention is employed in dyeing a textile, the depth of dye in the dyed textile should be up to about 10% based on the weight of the textile. More preferably, the depth of dye in the dyed textile should be about 1% to about 10%, even more preferably about 2% to about 8%, and most preferably the depth of dye in the dyed textile should be about 4% to about 6%. The textile may be selected from natural textiles or synthetic textiles. Examples of suitable natural textiles are wool, leather, and silk. Most preferably, synthetic textiles are chosen from nylons.

As reported in more detail in Example 8 below, the synthesized Fe complexed azo dyes, their unmetallized precursors, Mordant Black 1, and Acid Black 172 were each individually applied to textile materials (individual pieces of nylon and wool fabrics) at a 2% or 6% depth of shade, and the dyed materials were evaluated, for lightfastness, washfastness, and crockfastness according to established procedures (cf. 1987 Technical Manual of the American Association of Textile Chemists and Colorists). Nylon 66 fabric was dyed at 100° C. for 1 hour on an Ahiba Texomat dyeing machine using a dye bath containing 2% or 6% acid dye (as denoted in the Depth of Dyeing columns in the Tables of Example 8 below) and 3% $NH_4OAc$, based on the fabric weight, and a 40:1 liquor ratio. Wool fabric was dyed at 100° C. for 45 minutes on an Ahiba Texomat dyeing machine using a dye bath containing 2% or 6% acid dye (as denoted in the Depth of Dyeing columns in the Tables of Example 8 below) and 4% $(NH_4)_2SO_4$, based on the fabric weight, and a liquor ratio of 40:1. At 2% depth, the resulting dyed fabrics were substantially black, and at 6% depth, the resulting dyed fabrics were completely black. The resulting dyed fabrics were rinsed in warm water, rinsed in cold water, and then air-dried.

For the lightfastness tests in Example 8 below, the pieces of dyed textiles were subjected to standard conditions for assessing lightfastness for automotive fabric, as described in Bullock, J. E. and Garrett, D. L., "Colorfastness Correlation of Accelerated Aging Methods for Automotive Interior Trim," J. Ind. Fabrics 4(2), pp. 23-32 (1985). It is noted that Part 2 "Ci 65 Xenon Arc Weathermeter (XEN)" of Table 3 "Accelerated Aging Methods" of Bullock and Garrett contains a typographical error, and so the relative humidity was actually 50% Light/100% Dark cycle during the lightfast testing described below in Example 8, not 50% Dark/100% Light Cycle, as stated in Part 2 of Table 3 of Bullock and Garrett. The testing was done for 6 days at 225 kilo Joules per square meter of fabric as stated in Table 6 of Bullock and Garrett, and then two windows were opened on one side of the fabric (to give 451 Kilo Joules per square meter of fabric as shown in Table A of Example 8 below) for another 6 days.

As described in more detail in Example 8 below, when the synthesized Fe complexed azo dyes were applied to textiles, black dyeings resulted having lightfastness properties comparable to the lightfastness properties of textiles dyed with commercially important Cr-based black metallized dyes such as structure 2.

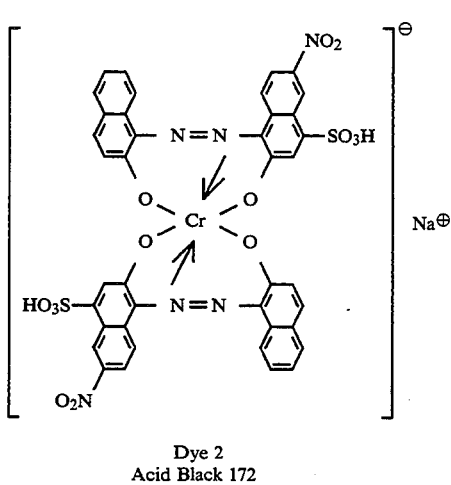

Dye 2
Acid Black 172

BEST MODE FOR CARRYING OUT THE INVENTION

The best mode was dye 6 and dye 9 denoted in the Laboratory Examples below.

Thus, in the preferred embodiment, the Fe complexed azo dyes comprise black 1:2 Fe complexed azo dyes of the formula

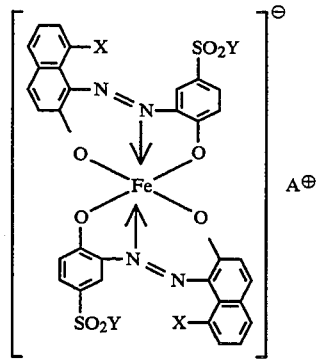

where preferably, X is H, Y is NH$_2$, and A is Na, or preferably X is NHCOCH$_3$, Y is NH$_2$, and A is Na.

The preferred black 1:2 Fe complexed azo dyes have superior lightfastness in the dyeing of textiles comparable to that of black 1:2 Cr complexed azo dye of the formula

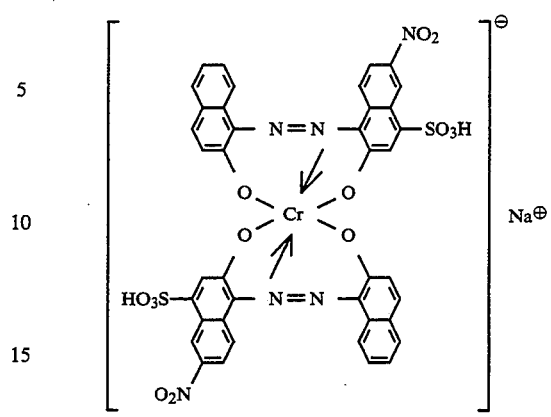

and known as Acid Black 172 (1:2 complex).

Also, in accordance with the preferred embodiment, a dyed textile is black when dyed with a black colored dye comprising a 1:2 Fe complexed azo dye of the formula

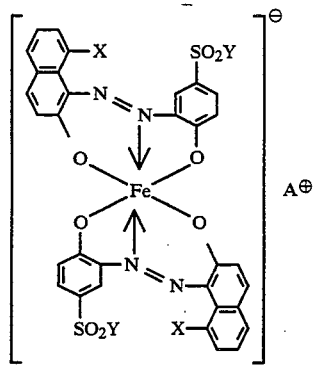

where preferably, X is H, Y is NH$_2$, and A is Na or preferably X is NHCOCH$_3$, Y is NH$_2$, and A is Na. The preferred dyed textile has superior lightfastness comparable to that of a comparable textile dyed at a substantially similar depth with black 1:2 Cr complexed azo dye of the formula

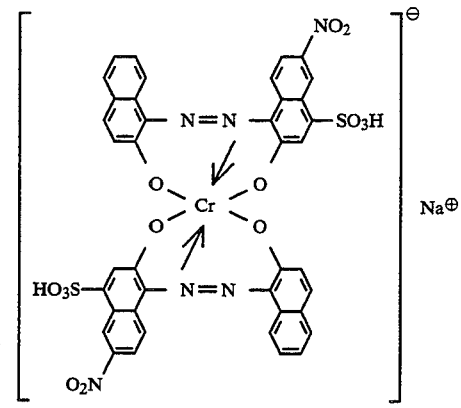

and known as Acid Black 172 (1:2 complex).

Also in accordance with the preferred embodiment of the present invention, a method to make a black colored dye useful for dyeing textiles comprises diazotization of 1-hydroxy-2-aminobenzenesulfonamide followed by coupling with 2-naphthol or 1-acetylamino-7-naphthol, to create an unmetallized dye described above as dye 4 or dye 7. Next the unmetallized dye is converted to a 1:2 Fe complexed azo dye using an iron salt at a pH of about 8 or less, preferably using Fe(II) sulfate or Fe(III) sulfate in the presence of sodium hydroxide (pH=7.5–8.0) or using Fe(III) sulfate in the presence of sodium formate (pH=5.5–6.0), whereby there results a 1:2 Fe complexed azo dye of the formula

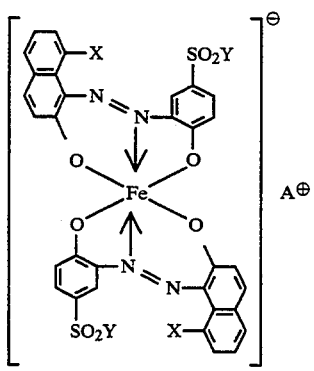

where preferably, X is H, Y is $NH_2$, and A is Na, or preferably X is $NHCOCH_3$, Y is $NH_2$, and A is Na. The preferred method results in a black 1:2 Fe complexed azo dye that has superior lightfastness in the dyeing of textiles comparable to that of black 1:2 Cr complexed azo dye of the formula

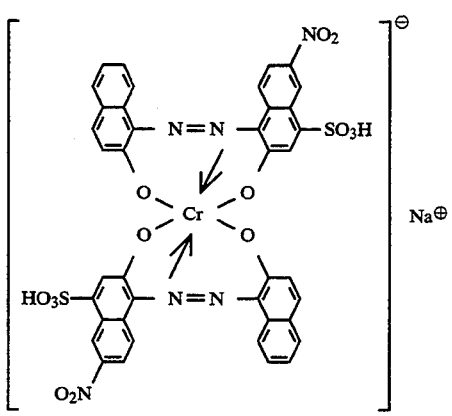

and known as Acid Black 172 (1:2 complex).

Also in accordance with the preferred embodiment of the present invention, a method of dyeing a textile black comprises dyeing a textile with a black colored dye, wherein said dye comprises a 1:2 Fe complexed azo dye of the formula

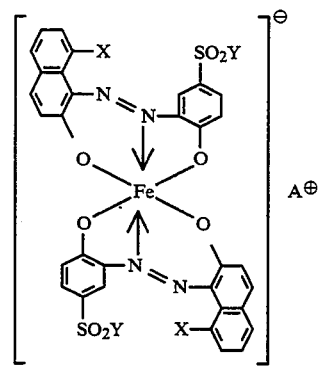

where preferably, X is H, Y is $NH_2$, and A is Na or preferably X is $NHCOCH_3$, y is $NH_2$, and A is Na. The preferred method results in a dyed textile that has superior lightfastness comparable to that of a comparable textile dyed at a substantially similar depth with black 1:2 Cr complexed azo dye of the formula

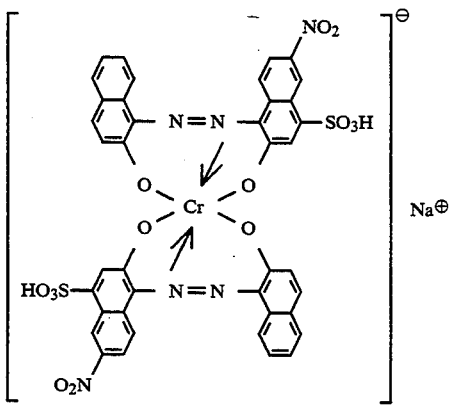

and known as Acid Black 172 (1:2 complex).

EXAMPLES

Example 1

Preparation of Dye 6 Embodiment of Dye 1

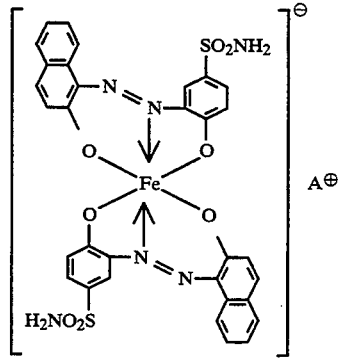

A solution of 7.53 g 1-hydroxy-2-aminobenzenesulfonamide in 100 mL water and 5 mL 30% NaOH was poured over 75 g crushed ice containing 11.6 mL 30% HCl. To the resulting stirred suspension, 10 mL 4N $NaNO_2$ were added at a rate such that the reaction temperature was kept at 5–8° C. After having been stirred for 1 hour, the reaction mixture was made neutral to Congo Red test paper using NaOAc. The formed diazonium salt solution was added dropwise to a stirred solution of 5.76 g 2-naphthol in 30mL water containing 6 mL 30% NaOH and 30 mL Na$_2$CO$_3$, and after the reaction mixture was stirred at 10° C. for 4 hours, the intermediate unmetallized dye was salted out of solution using 15% NaCl to give 13 g dye (which was dye 4 and was red). The metal-free monoazo dye was dissolved in 240 mL water containing 6.4 mL 20% NaOH. This solution was heated to 75° C. whereupon 5.56 g FeSO$_4$·7H$_2$O dissolved in 40 mL water were added. The reaction mixture was stirred at 75° C. for 3 hours, and the target 1:2 Fe complex was salted out of solution using 15% NaCl to give 12.4 g dye (which was dye 6 and was black).

Example 2

Preparation of Dye 6 Embodiment of Dye 1

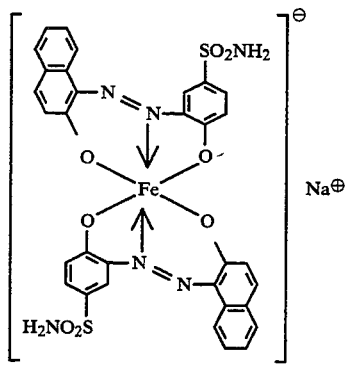

A solution of 7.53 g 1-hydroxy-2-aminobenzenesulfonamide in 100 mL water and 5 mL 30% NaOH was poured over 75 g crushed ice containing 11.6 mL 30% HCl. To the resulting stirred suspension, 10 mL 4N NaNO$_2$ were added at a rate such that the reaction temperature was kept at 5–8° C. After having been stirred for 1 hour, the reaction mixture was made neutral to Congo Red test paper using NaOAc. The formed diazonium salt solution was added dropwise to a stirred solution of 5.76 g 2-naphthol in 30 mL water containing 6 mL 30% NaOH and 30 mL Na$_2$CO$_3$, and after the reaction mixture was stirred at 10° C. for 4 hours, the intermediate unmetallized dye was salted out of solution using 15% NaCl to give 13 g dye (which was dye 4 and was red).

The metal-free monoazo dye was dissolved in 240 mL water containing 6.4 mL 20% NaOH. This solution was heated to 80° C. whereupon 4.9 g Fe$_2$(SO$_4$)$_3$·5H$_2$O in 25 mL water were added. The reaction mixture was stirred at 80–85° C. for 4 hours, and the target 1:2 Fe complex was salted out of solution using 15% NaCl to give 14.2 g dye (which was dye 6 and was black).

Example 3

Preparation of Dye 6 Embodiment of Dye 1

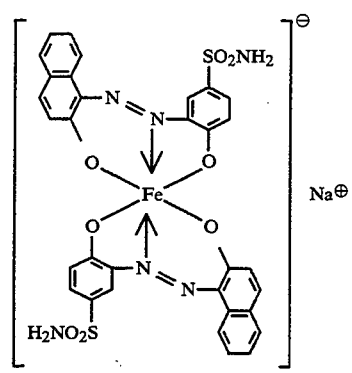

A solution of 7.53 g 1-hydroxy-2-aminobenzenesulfonamide in 100 mL water and 5 mL 30% NaOH was poured over 75 g crushed ice containing 11.6 mL 30% HCl. To the resulting stirred suspension, 10 mL 4N NaNO$_2$ were added at a rate such that the reaction temperature was kept at 5–8° C. After having been stirred for 1 hour, the reaction mixture was made neutral to Congo Red test paper using NaOAc. The formed diazonium salt solution was added dropwise to a stirred solution of 5.76 g 2-naphthol in 30 mL water containing 6 mL 30% NaOH and 30 mL Na$_2$CO$_3$, and after the reaction mixture was stirred at 10° C. for 4 hours, the intermediate unmetallized dye was salted out of solution using 15% NaCl to give 13 g dye (which was dye 4 and was red).

The metal-free monoazo dye was dissolved in 150 mL water containing 6.0 g sodium formate. This solution was heated to 80° C. whereupon 4.9 g Fe$_2$(SO$_4$)$_3$·5H$_2$O in 25 mL water were added. The reaction mixture was stirred at 80° C. for 3 hours, and the target 1:2 Fe complex was salted out of solution using 15% NaCl to give 14.1 g dye (which was dye 6 and was black).

Thus, as can be seen from Examples 1, 2 and 3, whether the starting material was Fe$^{+2}$ or Fe$^{+3}$, the same black 1:2 Fe azo complex, designated here as dye 6, was obtained.

Example 4

Preparation of Dye 9 Embodiment of Dye 1

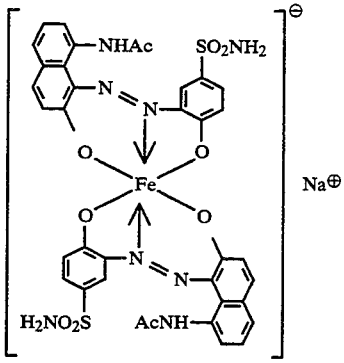

A solution of 7.53 g 1-hydroxy-2-aminobenzenesulfonamide in 100 mL water and 5 mL 30% NaOH was poured over 74 g crushed ice containing 11.6 mL 30% HCl. To the resulting stirred suspension, 10 mL 4N NaNO$_2$ were added at a rate such that the reaction temperature was kept at 5–8° C. After having been stirred for 1 hour, the reaction mixture was made neutral to Congo Red test paper using NaOAc. The formed diazonium salt solution was added dropwise to a stirred solution of 8.04 g 1-acetylamino-7-naphthol, 4 mL 30% NaOH, and 2.5 g Na₂CO₃ in 50 mL water. After the reaction mixture was stirred for 4 hours at 10° C., the intermediate unmetallized dye was salted out of solution using 15% NaCl to give 14.3 g of dye (which was dye 7 and was blue). The metal-free monoazo dye (0.02 mol) was dissolved in 240 mL water containing 6.4 mL 20% NaOH. This solution was heated to 75° C. whereupon 5.56 g FeSO₄·7H₂O dissolved in 40 mL water were added. The reaction mixture was stirred at 75° C. for 3 hours, and the target 1:2 Fe complex was salted out of solution using 15% NaCl to give 16.45 g dye (which was dye 9 and was black).

Example 5

Preparation of Dye 9 Embodiment of Dye 1

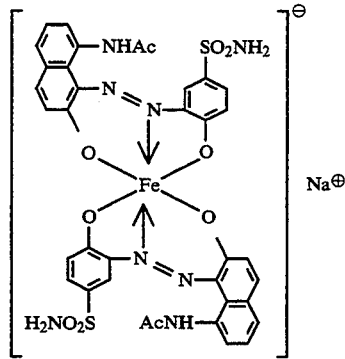

A solution of 7.53 g 1-hydroxy-2-aminobenzenesulfonamide in 100 mL water and 5 mL 30% NaOH was poured over 74 g crushed ice containing 11.6 mL 30% HCl. To the resulting stirred suspension, 10 mL 4N NaNO₂ were added at a rate such that the reaction temperature was kept at 5–8° C. After having been stirred for 1 hour, the reaction mixture was made neutral to Congo Red test paper using NaOAc. The formed diazonium salt solution was added dropwise to a stirred solution of 8.04 g 1-acetylamino-7-naphthol, 4 mL 30% NaOH, and 2.5 g Na₂CO₃ in 50 mL water. After the reaction mixture was stirred for 4 hours at 10° C., the intermediate unmetallized dye was salted out of solution using 15% NaCl to give 14.3 g of dye (which was dye 7 and was blue). The metal-free monoazo dye (0.02 mol) was dissolved in 240 mL water containing 6.4 mL 20% NaOH. This solution was heated to 80° C. whereupon 4.9 g Fe₂(SO₄)₃·5H₂O dissolved in 25 mL water were added. The reaction mixture was stirred at 80–85° C. for 4 hours, and the target 1:2 Fe complex was salted out of solution using 15% NaCl to give 16.0 g dye (which was dye 9 and was black).

Example 6

Preparation of Dye 9 Embodiment of Dye 1

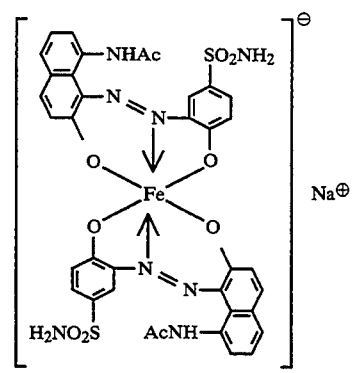

A solution of 7.53 g 1-hydroxy-2-aminobenzenesulfonamide in 100 mL water and 5 mL 30% NaOH was poured over 74 g crushed ice containing 11.6 mL 30% HCl. To the resulting stirred suspension, 10 mL 4N NaNO₂ were added at a rate such that the reaction temperature was kept at 5–8° C. After having been stirred for 1 hour, the reaction mixture was made neutral to Congo Red test paper using NaOAc. The formed diazonium salt solution was added dropwise to a stirred solution of 8.04 g 1-acetylamino-7-naphthol, 4 mL 30% NaOH, and 2.5 g Na₂CO₃ in 50 mL water. After the reaction mixture was stirred for 4 hours at 10° C., the intermediate unmetallized dye was salted out of solution using 15% NaCl to give 14.3 g of dye (which was dye 7 and was blue). The metal-free monoazo dye was dissolved in 150 mL water containing 6.0 g sodium formate. This solution was heated to 80° C. whereupon 4.9 g Fe₂(SO₄)₃·5H₂O dissolved in 25 mL water were added. The reaction mixture was stirred at 80° C. for 3 hours, and the target 1:2 Fe complex was salted out of solution using 15% NaCl to give 16.1 g dye (which was dye 9 and was black).

Thus, as can be seen from Examples 4, 5, and 6, whether the starting material was $Fe^{+2}$ or $Fe^{+3}$, the same black 1:2 Fe azo complex, designated here as dye 9, was obtained.

Example 7 (Comparative Example)

Preparation of Dye 11 and Dye 2

To 23.9 g 1-amino-2-naphthol-4-sulfonic acid in 30 mL water (pH 4.3–4.5), was added 0.137 g CuSO₄ in 10 mL water. This solution was stirred at room temperature as 25 mL 4N NaNO₂ were added dropwise maintaining a pH between 4–5. After the solution was stirred for 1 hour, the diazonium compound was isolated by acidifying with 50 mL 50% H₂SO₄, and then the isolated compound was added slowly to a stirred mixture of 17 g 25% oleum and 26.9 g 96% H₂SO₄ at room temperature. The reaction was cooled to 10° C. and stirred well as 5.62 g 70% HNO₃ and 5.62 g 96% H₂SO₄ were added at a rate required to maintain a reaction temperature of 10–20° C. The reaction was stirred at 5° C. for 1.5 hours, and then poured over 42 g ice to afford 21.79 g 1-amino-6-nitro-2-naphthol-4-sulfonic acid. This product was dissolved in a mixture of 10 mL water and 40 g ice. The pH was adjusted to 7.6–8.0 using 30% NaOH, and the mixture was stirred as a solution 12.24 g 2-naphthol and 4.2 g NaOH in 20 mL water was added. After the mixture was stirred for 5 hours at 25–30° C., 28 g of the metal-free dye (which was dye 11 and was black) were obtained by salting (10% per volume) the neutral reaction mixture. It is noted that dye 11 is commercially available as Mordant Black 11.

The metal-free dye (0.075 mol) was dissolved in a boiling solution of 42 ml 30% NaOH and 340 mL water. To this solution were added 150 mL 0.25 mol/L Na/K chromosalicylate solution. After stirring for 15 hours under reflux, the target 1:2 Cr complex (26 g) was isolated by salting and filtration (which was dye 2 and was black). It is noted that dye 2 is commercially available as Acid Black 172.

EXAMPLE 8

EVALUATION OF DYED TEXTILES

Fe complexed azo dyes, their unmetallized precursors, Mordant Black 1, and Acid Black 172 were each individually applied to individual pieces of textiles.

Application of Dyes to Wool

The fabric was dyed at 100° C. for 45 minutes on an Ahiba Texomat dyeing machine using a dyebath containing 2% or 6% dye and 4% $(NH_4)_2SO_4$, based on the fabric weight, and a liquor ratio of 40:1. The resulting fabrics were rinsed in warm water, rinsed in cold water, and air-dried.

Application of Dyes to Nylon

The fabric was dyed at 100° C. for 1 hour on an Ahiba Texomat dyeing machine using a dyebath containing 2% or 6% dye and 3% $NH_4OAc$, based on the fabric weight, and a 40:1 liquor ratio. The resulting fabrics were rinsed in warm water, rinsed in cold water, and air-dried.

Lightfastness Properties

Results from the evaluation of the lightfastness of both wool (a natural fiber) and nylon (a synthetic fiber) dyed with the dyes is summarized in Table A.

TABLE A

| | | | Lightfastness* | | | |
|---|---|---|---|---|---|---|
| | | | Wool | | Nylon | |
| Dye No. | Type of Metal | Depth of Dyeing | 225.6 kJ/m² | 451.2 kJ/m² | 225.6 kJ/m² | 451.2 kJ/m² |
| 11 (Comparative from Exam. 7) | None | 2% | <1 | <1 | <1 | <1 |
| 11 (Comparative from Exam. 7) | None | 6% | <1 | <1 | <1 | <1 |
| 2 (Comparative from Exam. 7) | Cr | 2% | 2 | 1 | 1-2 | <1 |
| 2 (Comparative from Exam. 7) | Cr | 6% | 4 | 4 | 1-2 | <1 |
| 4 (Comparative from Exam. 1) | None | 2% | <1 | <1 | <1 | <1 |
| 6 (Example 1) | Fe | 2% | 1-2 | <1 | <1 | <1 |
| 6 (Example 1) | Fe | 6% | 4 | 3 | 2-3 | 1 |
| 7 (Comparative from Exam. 4) | None | 2% | <1 | <1 | <1 | <1 |
| 9 (Example 4) | Fe | 2% | 1-2 | <1 | <1 | <1 |
| 9 (Example 4) | Fe | 6% | 5 | 4 | 2 | 1 |

*Derived from the standard test employing the Atlas Ci65 weatherometer to evaluate potential automotive-grade dyes.
Scale ranges from a low of 1 to a high of 5, with 1 being unsatisfactory and 5 being excellent.

As can be seen from Table A, the lightfastness of fabric dyed with the Fe complexed azo dyes was compared to the lightfastness of fabric dyed with the Cr complexed azo dyes, with the unmetallized precursors of the Cr dyes, and with the unmetallized precursors of the Fe complexed azo dyes. It was evident that the lightfastness of fabric dyed with Fe and Cr metallized dyes was generally better than fabric dyed with both their metal-free precursors.

Since dyes 6 and 9 were black, they could be used in place of the commercial Cr black dye sold as Acid Black 172 (which is dye 2) and so the lightfastness of fabric dyed with each of Fe dyes 6 and 9 was compared to the lightfastness of fabric dyed with Cr dye 2. The fabric dyed with each of Fe dyes 6 and 9 was found to possess lightfastness comparable to and, in some cases, slightly better than the lightfastness of the fabric dyed with 1:2 Cr complexed black dye 2. The chromium dye sold as Acid Black 172 (dye 2) is used in dyeing automobile upholstery, as that fabric is continually subjected to intense sunlight so that good lightfastness is required. Accordingly, since Fe dyes 6 and 9 are black dyes with good lightfastness, they afford an environmentally safe alternative to the chromium dye, Acid Black 172, which is based on an environmentally unsafe priority pollutant.

Crockfastness Properties (Rubbingfastness)

Crockfastness is a term used in the textile art to refer to the rubbingfastness of a dyed fabric. Each dyed piece of fabric was rubbed against a standard test fabric (undyed cotton). The results are summarized in Table B.

TABLE B

| Dye No. | Type of Metal | Depth of Dyeing | Crockfastness* | |
|---|---|---|---|---|
| | | | Wool | Nylon |
| 11 (Comparative from Exam. 7) | None | 2% | 5 | 4-5 |
| 11 (Comparative from Exam. 7) | None | 6% | 5 | 4-5 |
| 2 (Comparative from Exam. 7) | Cr | 2% | 5 | 4-5 |
| 2 (Comparative from Exam. 7) | Cr | 6% | 4-5 | 4-5 |
| 4 (Comparative from Exam. 1) | None | 2% | 4-5 | 4-5 |
| 6 (Example 1) | Fe | 2% | 4-5 | 4-5 |
| 6 (Example 1) | Fe | 6% | 4-5 | 4-5 |
| 7 (Comparative from Exam. 4) | None | 2% | 4-5 | 5 |
| 9 (Example 4) | Fe | 2% | 4-5 | 4-5 |
| 9 (Example 4) | Fe | 6% | 4-5 | 4-5 |

*Derived from AATCC Test Method 8-1985.
Scale ranges from a low of 1 to a high of 5, with 1 being unsatisfactory (indicating a high degree of transfer of the dye from the dyed fabric to the undyed standard) and 5 being excellent (indicating a low degree of transfer of the dye from the dyed fabric to the undyed standard).

As can be seen from Table B, black Fe dyes 6 and 9 had good rubbingfastness comparable to black Cr dye 2, as well as having the good lightfastness comparable to black Cr dye 2 that can be seen in Table A. Thus, the Fe complexed azo dyes afford an environmentally safe approach to dyeing fabric in situations, such as in the dyeing of nylon hosiery as well as in the dyeing of automobile upholstery, where good rubbingfastness comparable to that of Cr complexed azo dyes is needed.

Washfastness Data

Pieces of dyed fabric were tested for washfastness and the results are summarized in Table C.

TABLE C

| Dye No. | Type of Metal | Depth of Dyeing | Washfastness* Wool | Washfastness* Nylon |
|---|---|---|---|---|
| 2 (Comparative from Exam. 7) | Cr | 2% | 5 | 4–5 |
| 2 (Comparative from Exam. 7) | Cr | 6% | 4–5 | 4–5 |
| 6 (Example 1) | Fe | 2% | 5 | 5 |
| 6 (Example 1) | Fe | 6% | 4–5 | 5 |
| 9 (Example 4) | Fe | 2% | 4–5 | 5 |
| 9 (Example 4) | Fe | 6% | 5 | 5 |

*Derived from AATCC Test Method 61-1986, Test No. 2A.
Scale ranges from a low of 1 to a high of 5, with 1 being unsatisfactory, indicating significant color change, and 5 being excellent, indicating no color change.

As can be seen from Table C, fabric dyed with Fe complexed azo dye showed no color change, and thus had washfastness properties comparable to the washfastness properties of fabric dyed with Cr complexed azo dye.

Staining Data

Pieces of dyed fabric were tested for staining and the results are summarized in Table D.

TABLE D

| Dye No. | Type of Metal | Depth of Dyeing | Staining* Wool A | Staining* Wool B | Staining* Nylon A | Staining* Nylon B |
|---|---|---|---|---|---|---|
| 2 (Comparative from Exam. 7) | Cr | 2% | 4–5 | 4 | 4–5 | 4 |
| 2 (Comparative from Exam. 7) | Cr | 6% | 4–5 | 4–5 | 4–5 | 3–4 |
| 6 (Example 1) | Fe | 2% | 4 | 4 | 4 | 3–4 |
| 6 (Example 1) | Fe | 6% | 3–4 | 3–4 | 3–4 | 3 |
| 9 (Example 4) | Fe | 2% | 4 | 3–4 | 3–4 | 3 |
| 9 (Example 4) | Fe | 6% | 3–4 | 3 | 3–4 | 3 |

*Derived from AATCC Test Method 61-1986, Test No. 2A.
Scale ranges from a low of 1 to a high of 5, with 1 being unsatisfactory indicating unacceptable staining, 3 being acceptable indicating little staining, and 5 being excellent indicating no staining. A = staining of wool; B = staining of nylon.

For the staining evaluation, a piece of undyed fabric (A was wool fabric and B was nylon fabric) was attached to the dyed fabric to see if the dyed fabric bled onto the attached undyed fabric during laundering. As can be seen from Table D, fabric dyed with Fe complexed azo dye showed little or very little staining and thus was almost comparable to fabric dyed with Cr complexed azo dye.

It is also worthwhile to mention that 4% dyeing of fabric with Fe dyes 6 and 9 also gave good fastness, and satisfactory black shades. (This 4% dyeing was not reported in Tables A, B, C, or D.)

In general, the results demonstrated that it is possible to produce black 1:2 Fe-complexed azo dyes for protein substrates (namely natural substrates such as wool, silk, and leather) and synthetic polyamides (such as nylon) without compromising the good lightfastness of presently used commercially available black Cr complexed azo dyes, whether those Cr dyes are from premetallized azo dyes or from afterchrome mordant dyeing.

It is also clear that the substitution of "environmentally friendly" black-colored Fe-complexed azo dyes for certain azo dyes which are based on "priority pollutant" metals is a potentially viable approach to addressing the environmental problem of toxic wastewater currently associated with the use and manufacture of black Cr complexed azo dyes, whether those Cr dyes are from afterchrome mordant dyeing or from premetallized Cr azo dyes, for natural and synthetic fibers.

Moreover, these Fe analogues of the commercially available unmetallized and metallized acid red and acid blue dyes (which Fe analogues were black, not red or blue) showed a lightfastness comparable to commercially available Cr metallized acid black dye. Thus these black Fe analogues of the acid red and acid blue dyes can compete in terms of effectiveness with the black Cr complexed azo dye (sold as Acid Black 172) for the black dyeing of fabric, where the fabric is subjected to intense sunlight so that good lightfastness is needed, and at the same time these black Fe analogues are "environmentally friendly" by not creating the water pollution problem associated with Cr based metallized azo dyes such as Acid Black 172 Cr.

It will be understood that various details of the invention may be changed without departing from the scope of the invention. Furthermore, the foregoing description is for the purpose of illustration only, and not for the purpose of limitation-the invention being defined by the claims.

What is claimed is:

1. A method of dying natural and synthetic substrates black comprising dyeing a substrate with an Fe complexed azo dye, wherein said Fe complexed azo dye comprises an environmentally safe black 1:2 Fe complexed azo dye of the formula

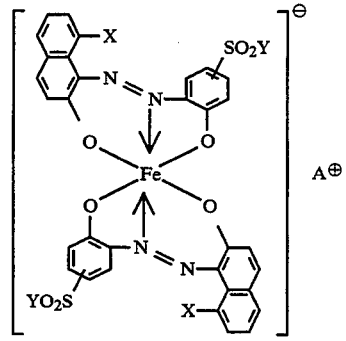

where X is H or NHCOR, R is $C_{1-6}$ alkyl, $C_{1-6}$ alkoxy, or $C_{1-6}$ hydroxyalkyl, Y is OH, $NH_2$, $N(C_{1-6}$ alkyl$)_2$, $NH(C_{1-6}$ alkyl), or $C_{1-6}$ alkyl, and A is H, K, Na, or $NH_4$, and whereby said method is an environmentally safe method.

2. The method of claim 1, wherein said dyed substrate has a lightfastness property comparable to that property in a substrate dyed at a substantially similar depth with a black 1:2 Cr complexed azo dye, which is based on an environmentally unsafe priority pollutant.

3. The method of dyeing a substrate according to claim 1, comprising dyeing a substrate black with a dye comprising a black 1:2 Fe complexed azo dye of the formula

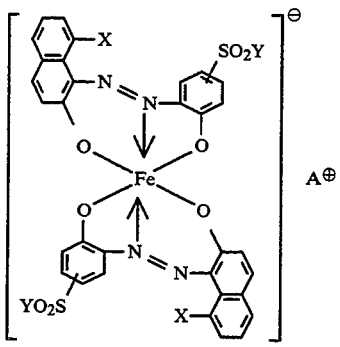

where X is H or NHCOR, R is $C_{1-6}$ alkyl, $C_{1-6}$ alkoxy, or $C_{1-6}$ hydroxyalkyl, Y is OH, $NH_2$, $N(C_{1-6}\ alkyl)_2$, $NH(C_{1-6}\ alkyl)$, or $C_{1-6}$ alkyl, and A is H, K, Na, or $NH_4$, and said dyed black textile having superior lightfastness comparable to that of a comparable substrate dyed black at a substantially similar depth with black 1:2 Cr azo dye of the formula

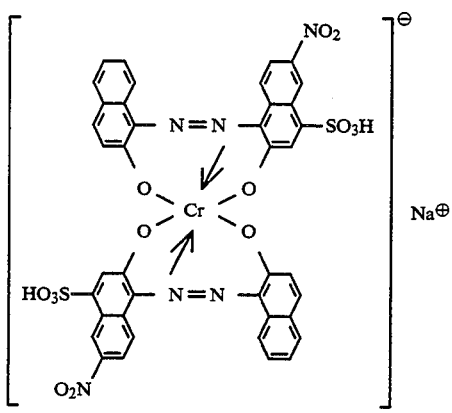

and known as Acid Black 172 (1:2 complex).

4. A method of dyeing natural and synthetic substrates black comprising dyeing a substrate with an Fe complexed azo dye, wherein said Fe complexed azo dye comprises an environmentally safe black 1:2 Fe complexed azo dye of the formula

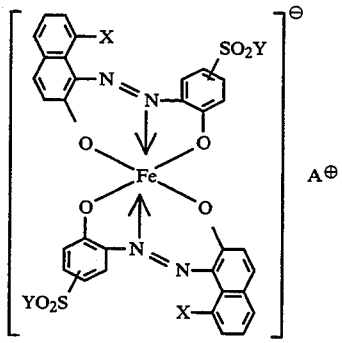

where X is H or NHCOR, R is $C_{1-6}$ alkyl, $C_{1-6}$ alkoxy, or $C_{1-6}$ hydroxyalkyl, Y is OH, $NH_2$, $N(C_{1-6}\ alkyl)_2$, $NH(C_{1-6}\ alkyl)$, or $C_{1-6}$ alkyl, and A is H, K, Na, or $NH_4$, wherein said method is free of Cr ions and Cu ions, and whereby said method is an environmentally safe method.

5. The method of claim 2 wherein the depth is up to dye based on the weight of the substrate.

6. A method of making a black colored dye useful for dyeing natural and synthetic substrates, said method comprising (1) diazotization of 1-hydroxy-2-aminobenzene, wherein the benzene moiety is substituted with $SO_2Y$ in the 4-position or the 5-position, (2) coupling the resultant with 7-naphthol, wherein the naphthol moiety is substituted with X in the 1-position, to create an unmetallized dye, (3) converting said unmetallized dye to a 1:2 Fe complex using a Fe salt at a pH of about 8 or less, and then (4) salting out said metallized dye by precipitating with A+ ions, where X is H or NHCOR, R is $C_{1-6}$ alkyl, $C_{1-6}$ alkoxy, or $C_{1-6}$ hydroxyalkyl, Y is OH, $NH_2$, $N(C_{1-6}\ alkyl)_2$, $NH(C_{1-6}\ alkyl)$, or $C_{1-6}$ alkyl, and A is H, K, Na, or $NH_4$, whereby there results an environmentally safe black 1:2 Fe complexed azo dye of the formula

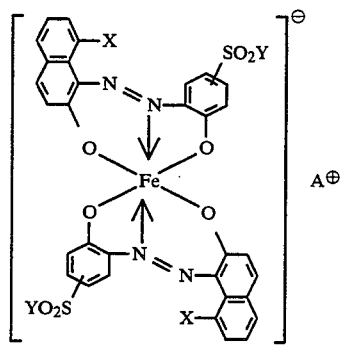

where X is H or NHCOR, R is $C_{1-6}$ alkyl, $C_{1-6}$ alkoxy, or $C_{1-6}$ hydroxyalkyl, Y is OH, $NH_2$, $N(C_{1-6}\ alkyl)_2$, $NH(C_{1-6}\ alkyl)$, or $C_{1-6}$ alkyl, and A is H, K, Na, or $NH_4$, and whereby said method is an environmentally safe method.

7. The method of claim 6, where the Fe salt is selected from the group consisting of iron sulfates, iron nitrates, iron halides, iron formates, iron acetates, and combinations thereof.

8. The method of making a dye useful for dyeing substrates according to claim 7, said method comprising diazotization of 1-hydroxy-2-aminobenzenesulfonamide followed by coupling with 2-naphthol or 1-acetylamino-7-naphthol, to create an unmetallized dye, followed by conversion of said unmetallized dye to a 1:2 Fe complex using Fe(II) sulfate or Fe(III) sulfate in the presence of sodium hydroxide (pH=7.5–8.0) or using Fe(III) sulfate in the presence of sodium formate (pH=5.5–6.0), and then salting out said metallized dye with Na+ ions, whereby there results a black 1:2 Fe complexed azo dye, wherein X is H or $NHCOCH_3$, Y is $NH_2$, and A is Na.

9. The method of making a dye useful for dyeing substrates according to claim 6, wherein said black 1:2 Fe complexed azo dye is of the formula

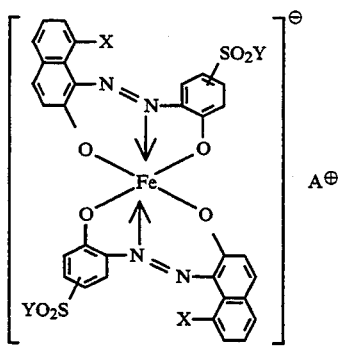

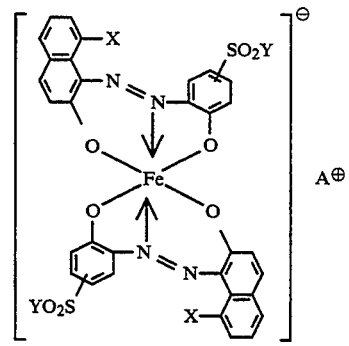

and said black 1:2 Fe complexed azo dye having superior lightfastness in the dyeing of substrates comparable to that of black 1:2 Cr complexed azo dye of the formula

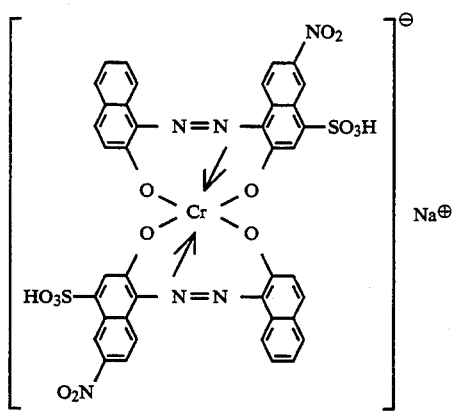

and known as Acid Black 172 (1:2 complex).

10. A method of making a black colored dye useful for dyeing natural and synthetic substrates, said method comprising (1) diazotization of a 1-hydroxy-2-aminobenzene, wherein the benzene moiety is substituted with $SO_2Y$ in the 4-position or the 5-position, (2) coupling the resultant with a 1-substituted 7-naphthol, wherein the naphthol moiety is substituted with X in the 1-position, to create an unmetallized dye, (3) converting said unmetallized dye to a 1:2 Fe complex using a Fe salt at a pH of about 8 or less, and then (4) salting out said metallized dye by precipitating with A+ ions, where X is H or NHCOR, R is $C_{1-6}$ alkyl, $C_{1-6}$ alkoxy, or $C_{1-6}$ hydroxyalkyl, Y is OH, $NH_2$, $N(C_{1-6}$ alkyl$)_2$, $NH(C_{1-6}$ alkyl), or $C_{1-6}$ alkyl, and A is H, K, Na, or $NH_4$, whereby there results an environmentally safe black 1:2 Fe complexed azo dye of the formula where X is H or NHCOR, R is $C_{1-6}$ alkyl, $C_{1-6}$ alkoxy, or $C_{1-6}$ hydroxyalkyl, Y is OH, $NH_2$, $N(C_{1-6}$ alkyl$)_2$, $NH(C_{1-6}$ alkyl), or $C_{1-6}$ alkyl, and A is H, K, Na, or $NH_4$, wherein said method is free of Cr ions and Cu ions and whereby said method is an environmentally safe method.

11. An Fe complexed azo dye useful for dyeing natural and synthetic substrates, said Fe complexed azo dye comprising a black 1:2 Fe complexed azo dye, wherein said Fe complexed azo dye is environmentally safe and wherein said Fe complexed azo dye has a lightfastness property in the dyeing of substrates, comparable to that property in a black 1:2 Cr complexed azo dye, which is based on an environmentally unsafe priority pollutant.

12. The dye useful for dyeing substrates according to claim 11, said dye comprising a black 1:2 Fe complexed azo dye of the formula

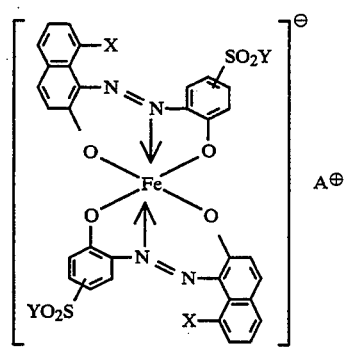

where X is H or NHCOR, R is $C_{1-6}$ alkyl, $C_{1-6}$ alkoxy, or $C_{1-6}$ hydroxyalkyl, y is OH, $NH_2$, $N(C_{1-6}$ alkyl$)_2$, $NH(C_{1-6}$ alkyl), or $C_{1-6}$ alkyl, and A is H, K, Na, or $NH_4$, and said black 1:2 Fe complexed azo dye having superior lightfastness in the dyeing of substrates comparable to that of black 1:2 Cr complexed azo dye of the formula

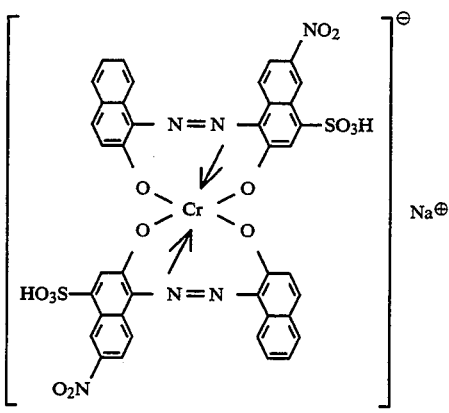

and known as Acid Black 172 (1:2 complex).

13. The 1:2 Fe complexed azo dye of claim 12, wherein X is H, A is Na, and Y is $NH_2$.

14. The 1:2 Fe azo complexed dye of claim 12, wherein X is $NHCOCH_3$, A is Na, and Y is $NH_2$.

15. A dyed substrate comprising a substrate dyed with a Fe complexed azo dye, wherein the Fe complexed azo dye comprises an environmentally safe black 1:2 Fe complexed azo dye of the formula

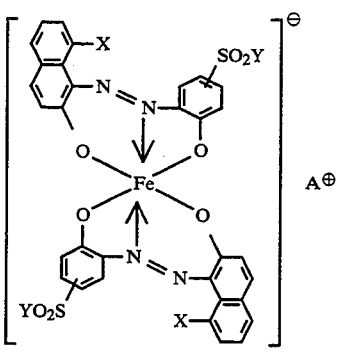

where X is H or NHCOR, R is $C_{1-6}$ alkyl, $C_{1-6}$ alkoxy, or $C_{1-6}$ hydroxyalkyl, Y is OH, $NH_2$, $N(C_{1-6}$ alkyl$)_2$, $NH(C_{1-6}$ alkyl), or $C_{1-6}$ alkyl, and A is H, K, Na, or $NH_4$, said dyed substrate having a lightfastness property comparable to that property in a substrate dyed at a substantially similar depth with a black 1:2 Cr complexed azo dye, which is based on an environmentally unsafe priority pollutant.

16. The dyed substrate of claim 15 dyed with said black 1:2 Fe azo dye at a depth up to 10% dye based on the weight of the substrate.

17. The dyed substrate of claim 15, wherein the depth of dye is from 4% to 10%.

18. The dyed substrate of claim 15, wherein the depth of dye is from 4% to 8%.

19. The dyed substrate of claim 15, wherein the depth of dye is from 4% to 6%.

20. The dyed substrate of claim 15, wherein the substrate is chosen from synthetic substrates.

21. The substrate of claim 20, wherein the synthetic substrate is chosen from nylons.

22. The dyed substrate of claim 15, wherein the substrate is chosen from natural substrates.

23. The substrate of claim 22, wherein the natural substrate is chosen from wool, silk, or leather.

24. The dyed substrate according to claim 15, comprising a substrate dyed black, wherein said dye comprises a black 1:2 Fe complexed azo dye of the formula

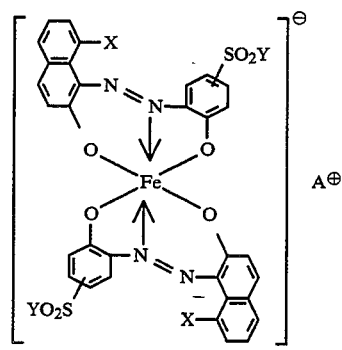

where X is H or NHCOR, R is $C_{1-6}$ alkyl, $C_{1-6}$ alkoxy, or $C_{1-6}$ hydroxyalkyl, Y is OH, $NH_2$, $N(C_{1-6}$ alkyl$)_2$, $NH(C_{1-6}$ alkyl), or $C_{1-6}$ alkyl, and A is H, K, Na, or $NH_4$, and said dyed black substrate having superior lightfastness comparable to that of a comparable substrate dyed black at a substantially similar depth with black 1:2 Cr complexed azo dye of the formula

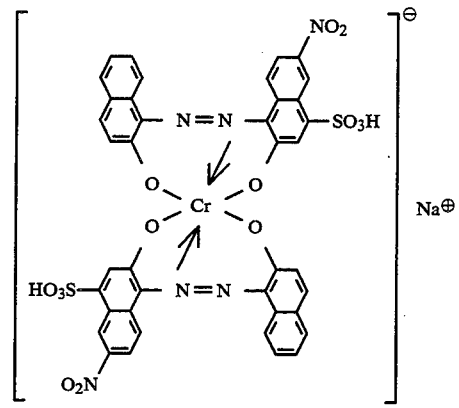

and known as Acid Black 172 (1:2 complex).

25. The dyed substrate of claim 24 dyed with said black 1:2 Fe complexed azo dye, wherein X is H, A is Na, and Y is $NH_2$.

26. The dyed substrate of claim 24 dyed with said black 1:2 Fe complexed azo dye, wherein X is $NHCOCH_3$, A is Na, and Y is $NH_2$.

* * * * *